United States Patent [19]

Sakata et al.

[11] Patent Number: 5,473,503
[45] Date of Patent: Dec. 5, 1995

[54] SOLID ELECTROLYTIC CAPACITOR AND METHOD FOR MANUFACTURING THE SAME

[75] Inventors: Koji Sakata; Atsushi Kobayashi; Takashi Fukaumi; Toshihiko Nishiyama; Satoshi Arai, all of Tokyo, Japan

[73] Assignee: NEC Corporation, Tokyo, Japan

[21] Appl. No.: 281,161

[22] Filed: Jul. 27, 1994

[30] Foreign Application Priority Data

Jul. 27, 1993 [JP] Japan ................................. 5-184284
Dec. 1, 1993 [JP] Japan ................................. 5-301512

[51] Int. Cl.⁶ .................................................. H01G 9/025
[52] U.S. Cl. ................................... 361/525; 361/523
[58] Field of Search ...................................... 361/523, 524, 361/525, 526, 527, 529; 252/62.2; 429/33, 191, 192

[56] References Cited

U.S. PATENT DOCUMENTS

| 3,950,842 | 4/1976 | Fournier et al. | 361/523 |
| 4,017,773 | 4/1977 | Cheseldine | 361/532 |
| 4,780,796 | 10/1988 | Fukuda et al. | 361/525 |
| 4,942,501 | 7/1990 | MacFarlane et al. | 361/523 |

FOREIGN PATENT DOCUMENTS

| 58-79255 | 5/1983 | Japan . |
| 63-158829 | 7/1988 | Japan . |
| 3163814 | 7/1991 | Japan . |
| 318009 | 1/1994 | Japan . |
| 0135223 | 8/1984 | United Kingdom . |
| 0379372 | 1/1990 | United Kingdom . |

OTHER PUBLICATIONS

Patent Abstracts of Japan, vol. 15, No. 197 (C-833) 21 May 1991 re JP-A-03 052 920 (Matsushita Electric Ind. Co. Ltd.) 7 Mar. 1991.

*Primary Examiner*—Teresa J. Walberg
*Assistant Examiner*—Gregory L. Mills
*Attorney, Agent, or Firm*—Sughrue, Mion, Zinn, Macpeak & Seas

[57] ABSTRACT

A solid electrolytic capacitor using a conductive polymeric compound as a solid electrolyte is disclosed, wherein a powder is dispersed in the conductive polymer to provide unevenness on the surface of the solid electrolyte, thereby increasing the surface area, whereby a mechanical adhesion between the solid electrolyte and a cathode conductor layer is increased. The conductive polymer comprises a first conductive polymer layer which contacts a dielectric layer at an anode body side, and a second conductive polymer layer which contacts the cathode conductor layer side, and the powder is dispersed in the second conductive polymer layer. By this constitution, tan δ and an equivalent series resistance (ESR) of the solid electrolytic capacitor are decreased.

10 Claims, 2 Drawing Sheets

FIG. 3

S1: OXIDE LAYER FORMATION STEP BY ANODIZATION

↓

S2: CHEMICALLY OXIDATIVE POLYMERIZATION STEP OF INNER CONDUCTIVE POLYPYRROLE LAYER

↓

S3: CHEMICALLY OXIDATIVE POLYMERIZATION STEP (EXAMPLES 1-7) OR ELECTROCHEMICALLY OXIDATIVE POLYMERIZATION STEP (EXAMPLE 9) OF OUTER CONDUCTIVE POLYPYRROLE LAYER

FIG. 4

S4: OXIDE LAYER FORMATION STEP BY ANODIZATION

↓

S5: CHEMICALLY OXIDATIVE POLYMERIZATION OF INNER CONDUCTIVE POLYPYRROLE LAYER

↓

S6: DEPOSITION STEP OF CONDUCTIVE POWDER

↓

S7: ELECTROCHEMICALLY OXIDATIVE POLYMERIZATION STEP OF OUTER CONDUCTIVE POLYPYRROLE LAYER

SOLID ELECTROLYTIC CAPACITOR AND METHOD FOR MANUFACTURING THE SAME

BACKGROUND OF THE INVENTION

The present invention relates to a solid electrolytic capacitor and a method for manufacturing the same, and more particularly to a solid electrolytic capacitor using a conductive polymer as a solid electrolyte and a method for manufacturing the same.

In general, the conventional solid electrolytic capacitor is that a molding obtained by increasing a surface area of a film-forming valve metal such as tantalum or aluminum by, for example, sintering a fine powder thereof or etching a rolled foil thereof is used as one electrode (anode) in counter electrodes, and a valve metal oxide layer ($Ta_2O_5$ or $Al_2O_3$) formed on the anode by an electrochemical anodization or the like is used as a dielectric layer. A conductive layer is formed on the oxidized dielectric layer, and this is used as another electrode (cathode) in the counter electrodes. In this case, a solid electrolyte is interposed between the cathode conductor layer and the oxidized dielectric layer to form part of the cathode.

A metal oxide layer such as manganese dioxide or lead dioxide ($PbO_2$) as disclosed in, for example, JP-A-3-163814 (the term "JP-A" as use herein means a Japanese Patent unexamined published application), or 7,7,8,8-tetracyanoquinodimethane complex salt (TCNQ complex salt) as disclosed in, for example, JP-A-58-79255 has conventionally been used as the solid electrolyte.

It is preferred for the solid electrolyte to have a function which electrically connects between the entire surface of the dielectric layer on the molding surface and the cathode conductor layer, and also a function which restores an electrical short circuit due to inner defect of the oxidized dielectric layer. For this reason, a metal which has a high conductivity but does not have a dielectric material repairing function cannot be used as the solid electrolyte, and manganese dioxide which transfers into an insulator by, for example, heat generated by short circuit electric current has been used. However, in the capacitor using a metal oxide such as manganese dioxide as a solid electrolyte, since the conductivity of the metal oxide is not sufficiently low, impedance at a high frequency region is large. Further, the capacitor using the TCNQ complex salt is poor in heat resistance due to that the TCNQ complex salt is liable to be thermally decomposed.

Recently, development on novel materials has been progressing in a field of polymer, and as a result, a conductive polymer exhibiting a conductivity is developed by doping a conjugated polymer such as a polypyrrole, a polythiophene or a polyaniline with an electron donative or electron attractive compound (dopant). In view of the fact that the polypyrrole shows a high conductivity and has a good stability with the passage of time, a solid electrolytic capacitor using the polypyrrole as the solid electrolyte material for cathode is developed as disclosed in, for example, JP-A-63-158829.

Further, JP-A-3-18009 proposes a method for manufacturing a solid electrolytic capacitor, wherein a conductive polymer layer by chemically oxidative polymerization of the polypyrrole is formed on the surface of an oxidized dielectric layer, and a graphite layer and a silver paste layer are successively formed thereon.

However, in the capacitor using the above-described conductive polymer as a solid electrolyte, the conductive polymer is formed in the form of a thin film, resulting in making the surface smooth. Therefore, there are problems that adhesiveness between the conductive polymer layer and the o graphite layer becomes poor, and an equivalent series resistance (ESR) in a high frequency region and a tangent of loss angle (tan δ) are large.

SUMMARY OF THE INVENTION

Accordingly, one object of the present invention is to provide a solid electrolytic capacitor having an improved adhesiveness between an conductive polymer as a solid electrolyte and a cathode conductor layer such as a graphite layer, and also having small ESR and tan δ, which can overcome the disadvantages involved in the prior art capacitors.

Another object of the present invention is to provide a method for manufacturing the solid electrolytic capacitor.

The solid electrolytic capacitor according to the present invention comprises a valve metal having an oxide layer of the valve metal as a dielectric layer formed on the surface thereof, a conductive polymer formed on the oxide layer as a solid electrolyte, and a cathode conductor layer formed on the conductive polymer, wherein unevenness is formed on the surface of the conductive polymer to increase adhesion with the cathode conductor layer.

The method for manufacturing the solid electrolytic capacitor according to the present invention comprises a step of forming oxide layer on the valve metal, a step of forming a conductive polymer on the oxide layer, and a step of forming a cathode conductor layer on the conductive polymer, wherein the conductive polymer forming step comprises a step of forming a first conductive polymer layer on the oxide layer by a chemically oxidative polymerization, and a step of forming a second conductive polymer layer on the first conductive polymer layer such that a conductive powder is interspersed in the second conductive polymer layer.

The conductive powder can be interspersed .in the second conductive polymer layer in such manner that the conductive powder is provided on the first conductive polymer layer and the second conductive polymer layer is then formed so as to cover the conductive powder, or the second conductive polymer layer containing the conductive powder is formed on the first conductive polymer layer by a chemically oxidative polymerization using a solution prepared by mixing the conductive powder with at least one of a monomer solution and an oxidizing agent solution, or by an electrochemically oxidative polymerization.

Various investigations have been made to overcome the problems in the prior art. As a result, it has been found in the present invention that a contact area between the conductive polymer and the cathode conductor layer thereon increases by a specific surface structure of the conductive polymer, i,e, by providing an unevenness to increase the adhesion to the cathode conductor layer, and as a result, the adhesiveness between the conductive polymer and the cathode conductor layer can be increased, thereby decreasing a contact resistance therebetween.

BRIEF DESCRIPTION OF THE DRAWINGS

FIG. 3 is a flow chart explaining the manufacturing steps of the capacitor shown in FIG. 1; and FIG. 4 is a flow chart explaining the manufacturing steps of the capacitor shown in FIG. 2

DESCRIPTION OF THE PREFERRED EMBODIMENTS

An outline of the manufacturing steps of the solid electrolytic capacitor according to the present invention is described using specific materials used in Examples 1 to 10 described hereinafter.

Figure 1A:
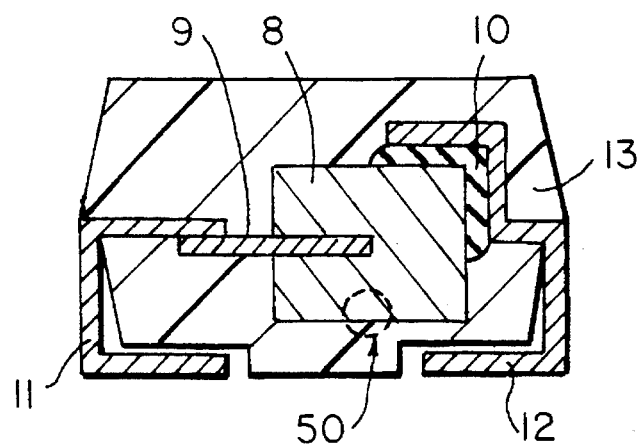
FIG. 1A is a schematic sectional view showing one example of the solid electrolytic capacitor manufactured according to the present invention.
Figure 1B:
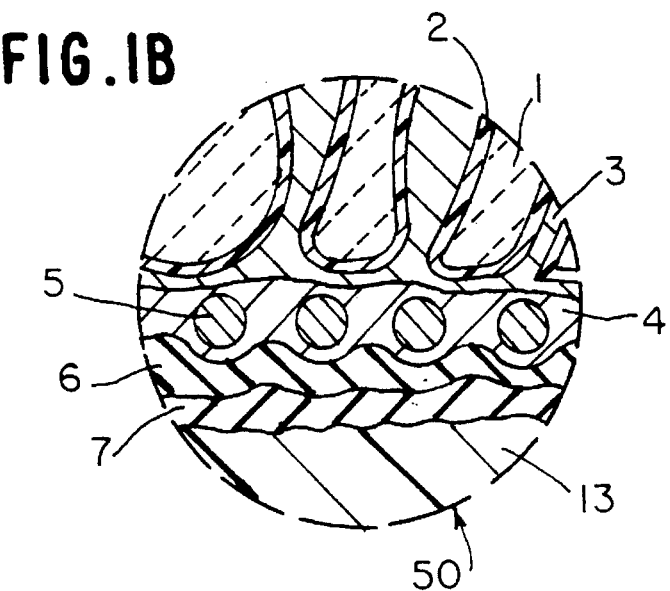
FIG. 1B is a partially enlarged sectional view of FIG. 1A, which corresponds to Examples 1 to 7 and 9.

A tantalum solid electrolytic capacitor shown in FIG. 1B which is an enlarged sectional view of a portion 50 shown in FIG. 1A is manufactured as follows. In Step S1 shown in FIG. 3, an anode body 1 obtained by molding and sintering a tantalum powder which is a valve metal is anodized to form an oxide layer 2 thereon as a dielectric layer. In Step S2, an inner polypyrrole layer 3 is formed as a first conductive polymer layer 3 on the surface of the oxide layer 2 by a chemically oxidative polymerization. In Step S3, a reaction liquid used is changed into a liquid containing a conductive Powder 5, and an outer polypyrrole layer 4 is formed as a second conductive polymer layer by a chemically oxidative polymerization (Examples 1–7) or alternatively by an electrochemically oxidative polymerization (Example 9). This leads to that the conductive powder 5 is interspersed in the outer polypyrrole layer 4. A graphite layer 6 and a silver paste layer 7 are successively formed on the outer polypyrrole layer to form a cathode conductive layer, thereby obtaining a capacitor element 8. An anode lead terminal 11 is welded on an anode lead wire 9 previously extended from the capacitor element 8, and a cathode lead terminal 12 and a silver paste layer 7 are adhered using a conductive adhesive 10 at the cathode side. Subsequently, the resulting assembly is encapsulated with an epoxy resin to complete the tantalum solid electrolytic capacitor.

Figure 2:
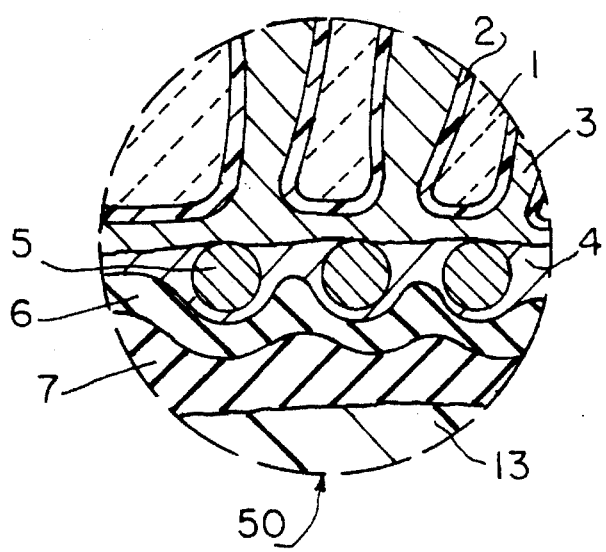
FIG. 2 is a partially enlarged sectional view of FIG. 1A, which corresponds to Examples 8 and 10.

On the other hand, an enlarged portion of the tantalum solid electrolytic capacitor shown in FIG. 2 is manufactured as follows. In Step S4 shown in FIG. 4, the anode body 1 is anodized in the same manner as in FIG. 1 to form the oxide layer 2. In Step S5, the inner polypyrrole layer 3 is formed on the surface of the oxide layer 2 by the chemically oxidative polymerization. In Step S6, the conductive powder 5 is deposited on the surface of the inner polypyrrole layer 3. In Step S7, the outer polypolypyrrole layer 4 is formed on the polypyrrole layer 3 having the conductive powder 5 deposited thereon by the chemically oxidative polymerization. The graphite layer 6 and the silver paste layer 7 are successively formed on the outer polypyrrole layer 4 to manufacture the capacitor element. The anode lead wire 9 and the anode lead terminal 11 are welded, and the silver paste layer 7 and the cathode lead terminal 12 are adhered with a conductive adhesive 10. Subsequently, the resulting assembly is encapsulated with the epoxy resin 13, and to complete the tantalum electrolytic capacitor.

The invention is described in more detail with reference to the following examples, but it should be understood and the invention is not construed as being limited thereto.

EXAMPLE 1

A columnar sintered body pellet (porosity:about 50%) having a diameter of 1 mm and a height of 1 mm which was obtained by molding a tantalum powder and sintering the molding was anodized at 15 V in a phosphoric acid aqueous solution, followed by washing and drying to obtain a sintered body having an oxidized dielectric layer 2 formed on the surface thereof. An electric capacity of the sintered body was measured in the phosphoric acid aqueous solution and was found to be 10.2 µF.

The oxide layer-formed sintered body was immersed in a 20 wt % methanol solution of ferric dodecylbenzenesulfonate, and dried at 25° C. The sintered body was further immersed in a 1 mol % pyrrole aqueous solution and maintained therein at room temperature for 30 minutes to conduct polymerization of the inner conductive polypyrrole layer 3. Subsequently, polymerization of the outer conductive polypyrrole layer 4 was performed on the surface of the inner conductive polypyrrole layer 3. The polymerization of the outer conductive polypyrrole layer 4 was conducted by washing the sintered body, on which the inner conductive polypyrrole layer 3 was already formed, with methanol, drying the same, immersing the sintered body in a 20 wt % methanol solution of ferric dodecylbenzenesulfonate drying the same at 25° C., immersing the sintered body in a 1 mol % pyrrole aqueous solution containing 5 wt % of a graphite powder having an average particle diameter of about 2 µm as the conductive powder, and then maintaining the same therein at the room temperature for 30 minutes. The graphite layer 6 and the silver paste layer 7 were successively formed on the outer conductive polypyrrole layer 4. The cathode side was connected to the cathode lead terminal 12 using the conductive adhesive 10. At the anode side, the anode lead wire 9 previously extended from the capacitor element 8 was welded on the anode lead terminal 11. The capacitor element 8 was encapsulated with the epoxy resin or the like, and the electrode portion was bent along the encapsulated portion to obtain a chip-type solid electrolytic capacitor.

EXAMPLE 2

A solid electrolytic capacitor was obtained in the same manner as in Example 1 except that in the formation step of the outer conductive polypyrrole layer 4, the conductive powder was not added to the pyrrole aqueous solution, and the graphite powder having an average particle diameter of about 2 µm was added to the 5 wt % methanol solution of 20 wt % ferric dodecylbenzenesulfonate.

EXAMPLE 3

A solid electrolytic capacitor was obtained in the same manner as in Example 1 except that in the formation steps of the inner conductive polypyrrole layer 3 and the outer conductive polypyrrole layer 4, ferric p-toluenesulfonate was used in place of the ferric dodecylebnzenesulfonate.

EXAMPLE 4

A solid electrolytic capacitor was obtained in the same manner as in Example 1 except that the conductive powder in the mixed liquid used for forming the outer conductive polypyrrole layer 4 was changed from the graphite powder having an average particle diameter of about 2 µm to a conductive polypyrrole powder having an average particle diameter of about 5 µm containing a dopant, and the solution was changed from the 1 mol % pyrrole aqueous solution containing 5 wt % of the conductive powder to a 50 wt % pyrrole/methanol solution containing 1 wt % of the conductive powder.

EXAMPLE 5

A solid electrolytic capacitor was obtained in the same manner as in Example 4 except that in the formation of the outer conductive polypyrrole layer 4, the conductive powder was not added to the 50 wt % pyrrole/methanol solution, but 1 wt % conductive polypyrrole powder having an average particle diameter of about 5 μm containing a dopant was added to the 20 wt % methanol solution of ferric dodecylbenzenesulfonate.

EXAMPLE 6

A solid electrolytic capacitor was obtained in the same manner as in Example 1 except that the conductive powder 5 was changed from the graphite powder to a palladium powder.

EXAMPLE 7

A solid electrolytic capacitor was obtained in the same manner as in Example 1 except that the conductive powder 5 was changed from the graphite powder to gold plated beads.

EXAMPLE 8

A columnar sintered body pellet (porosity: about 50%) having a diameter of 1 mm and a height of 1 mm obtained by molding a tantalum fine powder and sintering the melding was anodized at 60 V in a 0.1 wt % nitric acid aqueous solution, following by washing and drying to obtain a sintered body having the oxidized dielectric layer 2 formed on the surface thereof. The sintered body was immersed in a 20 wt % methanol solution of ferric dodecylbenzenesulfonate at the room temperature for 1 minute, and then immersed in a 50 wt % methanol solution of a pyrrole monomer at room temperature for 1 minute. The sintered body thus treated was maintained in air for 10 minutes to conduct the chemically oxidative polymerization. A series of those operations of filling of an oxidizing agent, contact with the pyrrole monomer, and the polymerization were repeated 10 times to form the inner polypyrrole layer 3.

The sintered body treated as above was maintained at the room temperature for 1 minute in a fluidized immersion layer having a polypyrrole powder having an average particle diameter of about 5 μm containing a dopant, floated on the layer, to deposit the polypyrrole powder containing the dopant on the surface of the inner polypyrrole layer 3 by the chemically oxidative polymerization.

The sintered body was further subjected to electrochemical polymeristice at a constant electric current of 1 mA for 30 minutes using an acetonitrile solution containing 0.3 mol/liter of the pyrrole monomer, and 0.3 mol/liter of dodecylbenzenesulfonate as an electrolyte to form the outer polypyrrole layer 4 on the inner polypyrrole layer 3 via the polypyrrole powder containing the dopant by the chemically oxidative polymerization. Unevenness of about 5 μm was formed on the surface of the outer polypyrrole layer 4 formed by the chemically oxidative polymerization. The element having the conductive polypyrrole layer formed thereon was washed and dried, and the graphite layer 6 and the silver paste layer 7 were successively formed thereon. The subsequent steps were followed in the same manners as in Example 1 to complete a solid electrolytic capacitor.

EXAMPLE 9

The steps until forming the inner polypyrrole layer 3 were followed in the same manners as in Example 8. The outer polypyrrole layer 4 was formed by the chemically oxidative polymerization using as the electrolyte a 50 wt % methanol solution of the pyrrole monomer containing 1 wt % of the conductive polypyrrole powder containing the dopant. The subsequent steps were followed in the same manner as in Example 8 to obtain a tantalum solid electrolytic capacitor.

In this Example, when the outer polypyrrole layer 4 as a second layer was formed by the electrolytically oxidative polymerization, the conductive polypyrrole powder for forming the irregularities could simultaneously be interspersed in the inside thereof. Although the reason for this is not sufficiently elucidated, it is presumed that the conductive polypyrrole powder for forming the unevenness is the solid electrolyte similar to the inner polypyrrole layer 3 and the outer polypyrole layer 4.

EXAMPLE 10

A tantalum solid electrolytic capacitor was obtained in the same manner as in Example 8 except that the conductive powder was changed from the conductive polypyrrole powder containing the dopant to a graphite powder having an average particle diameter of about 2 μm.

COMPARATIVE EXAMPLE

Using the same sintered body as used in the Examples, the oxidized dielectric layer and the inner polypyrrole layer by the chemically oxidative polymerization were formed in the same manner as in Example 8. The outer polypyrrole layer by the chemically oxidative polymerization was formed using the same electrolyte as used in Example 8. After washing and drying the sintered body thus treated, the graphite layer and the silver paste layer were successively formed thereon. After extending the cathode lead terminal from the capacitor element, the capacitor element was encapsulated with the epoxy resin to complete a solid electrolytic capacitor. The degree of the unevenness formed on the surface of the outer conductive polypyrrole layer, and tan δ at 120 Hz and ESR at resonant frequency of the capacitors completed in Examples 1 to 7, and the degree of the unevenness formed on the surface of the polypyrrole layer by the electrolytically oxidative polymerization, and tan δ at 120 Hz and ESR at resonant frequency of the capacitors completed in Examples 8 to 10 and the comparative Example are shown in the Table below together with the electric capacity.

TABLE

|  | Degree of Unevenness (μm) | Electric Capacity (μF) | Tan δ (%) | ESR (Ω) |
| --- | --- | --- | --- | --- |
| Example 1 | about 10 | 9.3 | 2.20 | 0.095 |
| Example 2 | about 10 | 9.2 | 2.18 | 0.091 |
| Example 3 | about 10 | 9.3 | 2.25 | 0.098 |
| Example 4 | about 50 | 9.3 | 1.96 | 0.100 |
| Example 5 | about 50 | 9.1 | 2.00 | 0.099 |
| Example 6 | about 50 | 9.4 | 1.92 | 0.090 |
| Example 7 | about 50 | 9.2 | 2.03 | 0.189 |
| Example 8 | about 50 | 3.2 | 1.87 | 0.115 |
| Example 9 | about 50 | 3.3 | 1.65 | 0.105 |
| Example 10 | about 10 | 3.3 | 1.88 | 0.109 |
| Comparative Example | about 2 | 3.3 | 3.51 | 2.32 |

As is apparent from the results shown in the Table above, the capacitors obtained in Examples 1 to 10 have small tan δ and ESR at resonant frequency as compared with the capacitor manufactured by the conventional method as obtained in the comparative Example.

Although the cathode conductor layer has a laminate structure comprising the graphite layer and the silver paste layer in the above-described Examples, increase in the adhesive force and decrease in contact resistance between the conductive polymer and the cathode conductor layer are due to increase in the contact area therebetween, and therefore the cathode conductor layer used in the present invention cannot be limited to the Examples. For example, a material which directly contacts the conductive polymer may not be a graphite layer as in the cathode conductor layer which uses the silver paste layer alone, and the structure of the cathode conductor layer may not be a laminate structure.

The unevenness formed on the surface of the conductive polymer is obtained by interspersing a powder in the conductive polymer. Since the conductivity to be possessed as the solid electrolyte is obtained by the conductive polymer, the powder for forming the unevenness may be either an insulating powder or a conductive powder. It is however preferred that the solid electrolyte itself has a low resistivity considering that the object of the present invention is to decrease ESR at a high frequency region and to decrease tan δ that is, those are concerned with the resistance value between the cathode and the anode. From this standpoint, it is preferred that the powder is a conductive powder. Further, the powder for forming the unevenness may be formed on the surface of the conductive polymer, or may be embedded in the conductive polymer such that part of the powder is exposed from the conductive polymer. According to the investigations by the present inventors, it has been found that structure that the powder was completely embedded in the conductive polymer could provide better results regarding the adhesion and the contact resistance.

In the present invention, the conductive polymer as the solid electrolyte has a laminate structure comprising a first conductive polymer layer which directly contacts the oxidized dielectric layer, and a second conductive polymer layer which directly contacts the cathode conductor layer, as described hereinabove. The conductive polymer is generally obtained by a chemically oxidative polymerization or an electrochemically oxidative polymerization, but it is preferred in the present invention that at least the first conductive polymer layer is obtained by the chemically oxidative polymerization. If it is tried to directly form the conductive polymer layer on the oxidized dielectric layer by the electrochemically oxidative polymerization, since the oxidized dielectric layer is an insulating material, an electrode for supplying an electric current necessary for the electrochemically oxidative polymerization must separately be provided by any means, and this makes the production step complicated.

A polypyrrole, a polyaniline, a polythiophene, a polyfuran, and a derivative thereof, which are obtained by subjecting a cyclic organic compound monomer such as pyrrole, aniline, thiophene or furan, or a derivative thereof to a chemically oxidative polymerization using a Lewis acid compound such as ferric dodecylbenzenesulfonate can be used as the first conductive polymer layer in the present invention. A material obtained by the same chemically oxidative polymerization as in the first conductive polymer layer, or a material obtained by an electrolytically oxidative polymerization can be used as the second conductive polymer layer. Where the second conductive polymer layer is formed by the electrochemically oxidative polymerization, the first conductive polymer layer which was already formed can be used as the electrode for supplying an electric current for an electrolysis, and it is therefore not necessary to add a fresh step to the production steps. It is not always required for the first conductive polymer layer and the second conductive polymer layer to be the same material.

Examples of the pyrrole derivative used in the present invention are a polynuclear pyrrole such as bipyrrole, a halogen-substituted pyrrole such as 3-bromopyrrole, an alkyl-substituted pyrrole such as 3-hexylpyrrole, and the like, but the pyrrole derivative is not limited to those compounds.

The Lewis acid compound used in the present invention is not particularly limited, but salts wherein a cation is a higher valent transition metal ion such as $Fe^{3+}$, $Cu^{2+}$, $Cr^6$, $Mn^7$ or $Sn^{4+}$, and an anion is an organic sulfonic acid ion such as an alkybenzenesulfonic acid ion, a naphthalenesulfonic acid ion, an alkylnaphthalenesulfonic acid ion, an alkylsulfonic acid ion, an α-olefin sulfonic acid ion, a sulfosuccinic acid ion or an N-acylsulfonic acid ion, or an organic sulfuric acid ion such as an alkyl sulfuric acid ion, a polyethylene oxide alkylethersufuric acid ion or a polyethylene oxide alkylpenolether sulfuric acid ion are preferred from the stand points of uniformity of the conductive polymer to be formed, and the like.

In the present invention, the above-described Lewis acid and cyclic organic compound monomer (or derivative thereof) such as pyrrole, aniline, thiophene or furan are directly or after dissolving in an appropriate solvent contacted with the molded article of the film-forming valve metal. The order of contacting the Lewis acid and the cyclic organic compound monomer (or derivative) is not particularly limited. Any contact method can be employed that the Lewis acid solution is coated on the oxidized dielectric layer-formed valve metal molding, and dried, and the cyclic organic compound monomer (or derivative) is then contacted therewith, or the Lewis acid solution and the cyclic organic compound monomer (or derivative) solution are simultaneously sprayed on the valve metal molding. The cyclic organic compound monomer (or derivative) is polymerized immediately contacting the Lewis acid. The polymerization temperature, the polymerization time, and the like are not particularly limited.

The oxide layer-forming metal used in the present invention is a metal having a valve function, such as tantalum, aluminum, titanium, niobium, zirconium, zinc, bismuth, silicon or hafnium, and the molding of the metal, such as a sintered body, a rolled foil or an etched product can be used in the present invention. The method for forming the oxidized dielectric layer on the film-forming valve metal is not particularly limited, and the conventional electrochemical anodization and the like can be employed.

According to the present invention, the conductive polymer formed as the solid electrolyte is, if required and necessary, washed with an appropriate solvent and dried, thereafter the cathode conductor layer is provided thereon, and the outer cathode lead terminal is connected thereto to thereby assemble the solid electrolytic capacitor. A laminate structure comprising the graphite layer and the silver paste layer is usually used as the cathode conductor layer, as used in the Examples, but the present invention is not particularly limited to this structure as described above. Further, the connection between the cathode conductor layer and the outer cathode lead terminal is generally performed using a conductive adhesive such as a silver paste, but a conductive carbon paste or the like may be used.

The solid electrolytic capacitor in which the powder for forming the unevenness is embedded in the conductive polymer, as described hereinabove has either of the following two structures. The first structure is a solid electrolytic capacitor comprising the first conductive polymer layer formed on the oxidized dielectric layer by the chemically oxidative polymerization, the conductive powder provided on the first conductive polymer layer such that the powder is dispersed on the first conductive powder or is present in a layer form on the first conductive layer, and the second conductive polymer layer which covers the conductive powder or has the conductive powder interspersed therein. The first capacitor is characterized in that the first conductive polymer layer and the powder for forming the unevenness are contacted. The second conductive polymer layer covers the powder, and if the powder is in a dispersed state and the first conductive polymer layer is not completely covered with the powder, the second conductive polymer layer also covers the exposed portions of the first conductive polymer layer.

In manufacturing the first structure capacitor, a method wherein the valve metal molding which have been completed until the step of forming the first conductive polymer layer is maintained in a fluidized immersion bath having the powder floated thereon is easily and simple as the method for dispersing the powder for forming the unevenness on the first conductive polymer layer or providing the powder in a layer form on the first conductive layer.

The second solid electrolytic capacitor is a capacitor comprising the first conductive polymeric compound layer formed on the oxide layer by the chemically oxidative polymerization, and the second conductive polymer layer containing the conductive powder therein. In the second structure capacitor, the powder for forming the unevenness which directly contacts the first conductive polymer layer is decreased, and extremely speaking, all the powder is interspersed in the second conductive polymer layer in a floating state.

The second structure capacitor is manufactured by a manufacturing method comprising a step of forming the first conductive polymer layer on the oxidized dielectric layer by the chemically oxidative polymerization, and a step for forming the second conductive polymer layer containing the conductive powder on the first conductive layer by the chemically oxidative polymerization using a solution prepared by dispersing the conductive powder in at least one of the monomer(or derivative) solution and the Lewis acid solution. In forming the second conductive polymer layer, it is not particularly limited if the powder is mixed with either the Lewis acid or the cyclic organic compound monomer (or derivative). The present invention can be performed so long as the powder is mixed with at least one of those solution.

Where the powder for forming the unevenness is a conductive polymer (solid electrolyte) powder, the second structure solid electrolytic capacitor can also be manufactured by a method including a step of forming the second conductive polymer layer. The conductive polymer powder is dispersed in the layer at the same time when forming the second conductive polymer layer.

According to those two manufacturing methods, the powder for forming the unevenness can be dispersed in the layer to be formed at the same time when forming the second conductive polymer. Therefore, the manufacturing steps can be simplified.

Further, in the above-described Examples wherein the second conductive polymer layer formed by the electrochemically oxidative polymerization, the second conductive polymer layer may be formed by the chemically oxidative polymerization in place of the electrochemically oxidative polymerization.

As described above, according to the present invention the unevenness can be formed on the surface of the conductive polymer layer by interspersing the powder in the conductive polymer layer as the solid electrolyte of a solid electrolytic capacitor, and as a result, the adhesion between the solid electrolyte layer and the graphite layer can be increased, and the tangent of the loss angle (tan $\delta$) and the equivalent series resistance (ESR) can be minimized.

While the invention has been described in detail and with reference to specific examples thereof, it will be apparent to one skilled in the art that various changes and modifications can be made therein without departing from the spirit and scope thereof.

What is claimed is:

1. A solid electrolytic capacitor comprising:

an anode body of valve metal, an oxide layer of the valve metal formed on the anode body, a first electrically conductive polymer layer formed on the oxide layer, a second electrically conductive polymer layer formed on the first electrically conductive polymer layer, a plurality of electrically conductive powders dispersed within the second electrically conductive polymer layer to cause a surface of the second electrically conductive polymer layer to be an uneven surface that includes a plurality of convex portions and a plurality of concave portions, each of the convex portions being formed along an associated one of the electrically conductive powders and each of the concave portions being formed between adjacent ones of the electrically conductive powders to intervene therebetween, and a cathode conductor layer formed on the second electrically conductive polymer layer with an adhesiveness enhanced by the uneven surface of the second electrically conductive polymer layer.

2. A solid electrolytic capacitor as claimed in claim 1, wherein each of the electrically conductive powders are at least one or more powders selected from the group consisting of a graphite powder, an electrically conductive polymer powder, a metal powder, and an insulating material powder covered with a conductive material.

3. A solid electrolytic capacitor as claimed in claim 2, wherein the metal powder is aluminum, nickel, palladium, gold, silver, copper or a powder of an alloy of those metals.

4. A solid electrolytic capacitor as claimed in claim 2, wherein the first electrically conductive polymer layer and the second electrically conductive polymer layer comprise a polymer of a monomer of a cyclic organic compound or a derivative thereof.

5. A solid electrolytic capacitor as claimed in claim 4, wherein the cyclic organic compound is selected from the group consisting of pyrrole, aniline, thiophene and furan.

6. A solid electrolytic capacitor as claimed in claim 1, wherein each of the electrically conductive powders has an average particle diameter of about 2 $\mu$m.

7. A solid electrolytic capacitor comprising:

a valve metal, an oxide layer of the valve metal formed on the valve metal, an electrically conductive polymer layer formed on the oxide layer, a plurality of electrically conductive powders dispersed within the electrically conductive polymer layer to cause a surface of the electrically conductive polymer layer to be an uneven surface that includes a plurality of convex portions and a plurality of concave portions, each of the convex portions being formed along an associated one of the electrically conductive powders and each of the concave portions being formed between adjacent ones of the electrically conductive powders to intervene therebetween, and a cathode conductor layer formed on the uneven surface of the electrically conductive polymer layer.

8. A solid electrolytic capacitor as claimed in claim 7, wherein the electrically conductive polymer layer comprises a first electrically conductive polymer layer formed on the oxide layer by a chemically oxidative polymerization, and a second electrically conductive polymer layer having the powders dispersed therein, formed on the first electrically conductive polymer layer.

9. A solid electrolytic capacitor as claimed in claim 8, wherein the electrically conductive powders are particles made of graphite powder and are uniformly dispersed in the second electrically conductive polymer layer.

10. A solid electrolytic capacitor as claimed in claim 8, wherein the powder has an average particle diameter of about 2 μm.

* * * * *